(No Model.)

W. E. WALDRON.
NUT LOCK.

No. 595,448. Patented Dec. 14, 1897.

WITNESSES
L. S. Elliott,
Chas. T. Lowell

William E. Waldron
INVENTOR
By Eugene W. Johnson
his Attorney

UNITED STATES PATENT OFFICE.

WILLIAM E. WALDRON, OF WASHINGTON, PENNSYLVANIA.

NUT-LOCK.

SPECIFICATION forming part of Letters Patent No. 595,448, dated December 14, 1897.

Application filed October 2, 1897. Serial No. 653,792. (No model.)

*To all whom it may concern:*

Be it known that I, WILLIAM E. WALDRON, a citizen of the United States of America, residing at Washington, in the county of Washington and State of Pennsylvania, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain new and useful improvements in nut-locks, the object being to furnish a locking-nut which is applicable to bolts of ordinary construction and when applied thereto will prevent the nut unscrewing from the bolt, the locking member of the nut impinging against the base and sides of the threads, so that the engagement between the locking-bolt and thread will not injure the threads.

My invention also consists in the improved means for throwing or holding the locking-bolt out of engagement with the thread of the bolt when it is desired to remove the nut.

Figure 1:
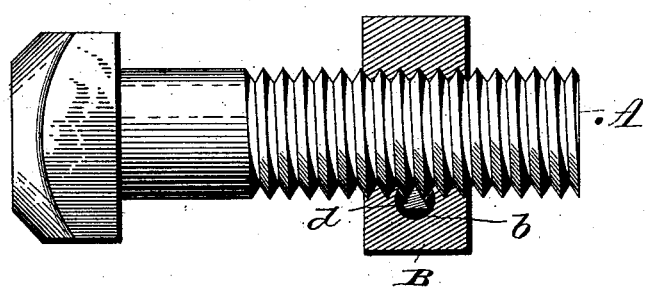
Figure 2:
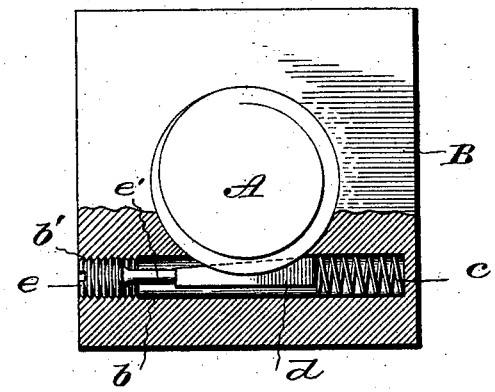

In the drawings, Figure 1 is a sectional view of the nut, showing it applied to a bolt; and Fig. 2 is an end view, partly in section.

A refers to the bolt, which is of ordinary construction. The lock-nut B is provided with an aperture b, which is formed by boring a hole through one side of the nut, so that it will intersect the threads thereof. This hole or aperture does not extend quite through the nut, being closed at one end, while the other end, which is open, is provided with threads b'. In the aperture or hole b of the nut is first placed a coiled spring c. Then a locking dog or bolt is placed in the aperture so as to rest upon the spring. The aperture is then closed by a screw e, said screw having an extension or pin e', formed integral therewith, which is of less diameter than the threaded portion of the screw.

The locking dog or bolt d is provided with two straight sides of the same pitch or angle as the thread of the bolt, and the same may be triangular in cross-section as a preferred form. The other side may be straight, as shown in Fig. 1, to present a locking dog or bolt which is triangular in cross-section, or it may be round, the essential features being that the locking dog or bolt presents two sides which converge to a point, which will impinge against the threads of the bolt. This locking bolt or dog tapers longitudinally, the larger end bearing upon the spring, while the smaller end lies adjacent to the end e' of the screw. The locking dog or bolt is preferably serrated, so that it will better grip or bite the thread of the bolt.

In operation the nut can be screwed on the bolt in the usual way, and when being screwed on the thread of the bolt engaging with the locking dog or bolt of the nut will force the same against the spring and allow the nut to be turned. A movement of the nut in a reverse direction immediately moves the locking dog or bolt in an opposite direction, so as to cause it to bite or engage with the sides and base of the threads of the bolt, so as to hold the parts securely in engagement with each other. When it is desired to remove the nut, the screw e is turned sufficiently to move the locking-dog out of engagement with the thread of the bolt. The screw can then be taken off in the usual manner. The screw also serves to close the aperture.

Having thus described my invention, what I claim as new, and desire to secure by Letters Patent, is—

1. In a nut-lock a nut provided with an aperture closed at one end and threaded at the other a longitudinally-tapered locking-dog positioned in the aperture and a spring also located in the aperture to effect a movement of the locking-dog toward the open end of the aperture; together with a screw for moving the locking-dog toward the spring substantially as shown.

2. In a nut-lock the combination with a bolt of a nut provided with a recess a locking dog or bolt which is tapered longitudinally and provided with angular sides which are adapted to engage with the thread of the bolt, a spring for effecting a movement of the locking-dog in one direction and a closure for the aperture as a screw for moving the locking-dog in an opposite direction from which it is moved by the spring.

3. In a nut-lock a nut provided with an aperture $b$ closed at one end and threaded at the other a spring $c$ located at one end of the aperture a screw having a reduced end $e'$ and a locking dog or bolt positioned in the aperture between the spring and screw, said locking-dog being tapered longitudinally and provided with converging sides with roughened faces said sides being of the same angle as the angle of the threads of the bolt substantially as shown and for the purpose set forth.

In testimony whereof I affix my signature in presence of two witnesses.

WILLIAM E. WALDRON.

Witnesses:
MINNIE A. LEONARD,
THOMAS MORGAN.